US010466050B2

(12) United States Patent
Latova et al.

(10) Patent No.: US 10,466,050 B2
(45) Date of Patent: Nov. 5, 2019

(54) HYBRID TOTAL STATION WITH ELECTRONIC LEVELING

(71) Applicant: Carlson Software Inc., Maysville, KY (US)

(72) Inventors: Jesus Latova, Madrid (ES); William C. Herter, Gastona, NC (US); Matthew Hutchinson, Monticello, KY (US); Sarah Winter, Maysville, KY (US); Ken Trent, St. George, UT (US)

(73) Assignee: Carlson Software, Inc., Maysville, KY (US)

( * ) Notice: Subject to any disclaimer, the term of this patent is extended or adjusted under 35 U.S.C. 154(b) by 15 days.

(21) Appl. No.: 15/945,383

(22) Filed: Apr. 4, 2018

(65) Prior Publication Data

US 2018/0224277 A1 Aug. 9, 2018

Related U.S. Application Data

(63) Continuation-in-part of application No. 14/730,900, filed on Jun. 4, 2015, now Pat. No. 10,101,459.

(Continued)

(51) Int. Cl.
*G01C 15/08* (2006.01)
*G01C 15/00* (2006.01)

(Continued)

(52) U.S. Cl.
CPC ........... *G01C 15/008* (2013.01); *G01C 15/06* (2013.01); *G01S 19/13* (2013.01); *G05D 1/0278* (2013.01);

(Continued)

(58) Field of Classification Search
CPC .............................. G01C 15/008; G01S 19/13

(Continued)

(56) References Cited

U.S. PATENT DOCUMENTS 5,512,905 A * 4/1996 Nichols .................. G01C 15/06 33/366.12
5,671,160 A * 9/1997 Julian .................... G01C 15/00 33/293

(Continued)

OTHER PUBLICATIONS

"Leica SmartStation total Station with integrated GPS", pp. 1-9; Leica Geosystems AG; Switzerland; www.leica-geosystems.com.

(Continued)

*Primary Examiner* — Christopher W Fulton
(74) *Attorney, Agent, or Firm* — Davis, Malm & D'Agostine, P.C.; Richard L. Sampson

(57) ABSTRACT

A GNSS data collection system includes a pole mounted GNSS receiver and inclination sensors. A data collection module provides a data collection graphical user interface (GUI) visible on a hand-held data collector computer. The data collector computer is communicably coupled to the GNSS receiver and receives three-dimensional location data and inclination data for the range pole in real-time. A virtual level component uses the inclination data to display on the GUI real-time tilt information in the form of a virtual bubble level indicator. The inclination data and height of the range pole are used to calculate and display horizontal distance and direction to level the GNSS receiver, using:

$$incline = a\cos(\cos(x\_tilt)*\cos(y\_tilt))$$

where,
xtilt=the inclination data for the range pole along the x axis,
ytilt=the inclination data for the range pole along the y axis, and $$horizontaldistancefromlevel = rh*\sin(incline)$$

where,
rh=the height of the range pole.

27 Claims, 12 Drawing Sheets

Related U.S. Application Data

(60) Provisional application No. 62/008,933, filed on Jun. 6, 2014.

(51) Int. Cl.
*G01C 15/06* (2006.01)
*G05D 1/02* (2006.01)
*G01S 19/13* (2010.01)

(52) U.S. Cl.
CPC ............ *Y10S 901/01* (2013.01); *Y10S 901/46* (2013.01); *Y10S 901/47* (2013.01)

(58) Field of Classification Search
USPC ................................ 33/290, 293; 342/357.2
See application file for complete search history.

(56) References Cited

U.S. PATENT DOCUMENTS

| | | | | |
|---|---|---|---|---|
| 6,052,083 | A * | 4/2000 | Wilson | G01C 15/00 342/357.34 |
| 6,628,308 | B1 * | 9/2003 | Greenberg | G01C 15/00 345/661 |
| 7,886,450 | B1 * | 2/2011 | Fiano | G01C 15/105 33/286 |
| 8,125,379 | B2 * | 2/2012 | Allison | G01C 15/00 342/357.47 |
| 9,109,889 | B2 * | 8/2015 | Soubra | G01C 15/00 |
| 9,134,127 | B2 * | 9/2015 | Soubra | G01C 15/00 |
| 9,513,120 | B2 * | 12/2016 | Briggs | G01C 15/00 |
| 9,562,764 | B2 * | 2/2017 | France | G01C 15/00 |
| 9,689,990 | B2 * | 6/2017 | Fortune | G01S 19/42 |
| 10,101,459 | B2 * | 10/2018 | Latova | G01C 9/06 |
| 2007/0052950 | A1 * | 3/2007 | Taylor | E02F 3/842 356/139.01 |
| 2015/0268045 | A1 * | 9/2015 | Dusha | G01C 15/06 33/228 |
| 2015/0276402 | A1 * | 10/2015 | Grasser | G01C 15/06 702/150 |
| 2016/0138919 | A1 * | 5/2016 | Green | G06T 17/00 348/135 |
| 2018/0100931 | A1 * | 4/2018 | Kipka | G01C 15/06 |
| 2019/0094388 | A1 * | 3/2019 | Gorcke | G01C 19/34 |

OTHER PUBLICATIONS

Kohanbash, David: "Position Tracking: Total Station"; robotsfor-roboticists.com (blog post); Jun. 13, 2014; pp. 1-5.

* cited by examiner

FIG. 12
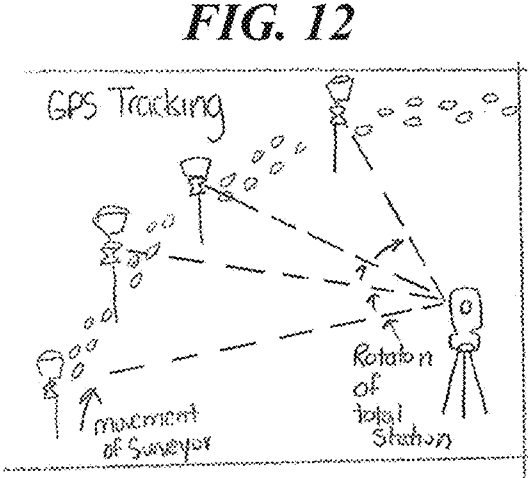
FIG. 13
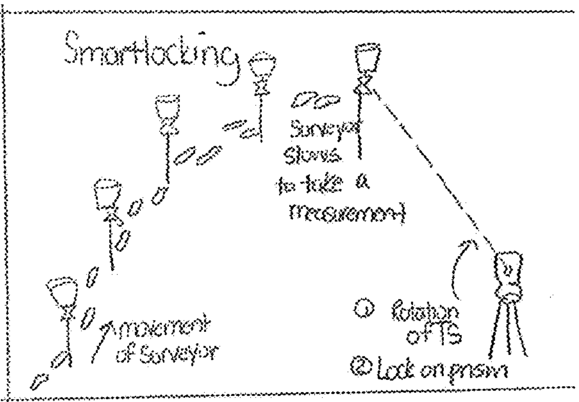
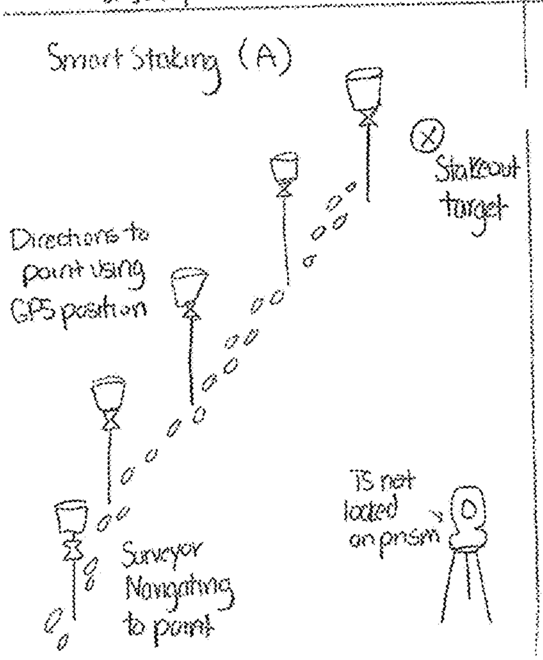
FIG. 14
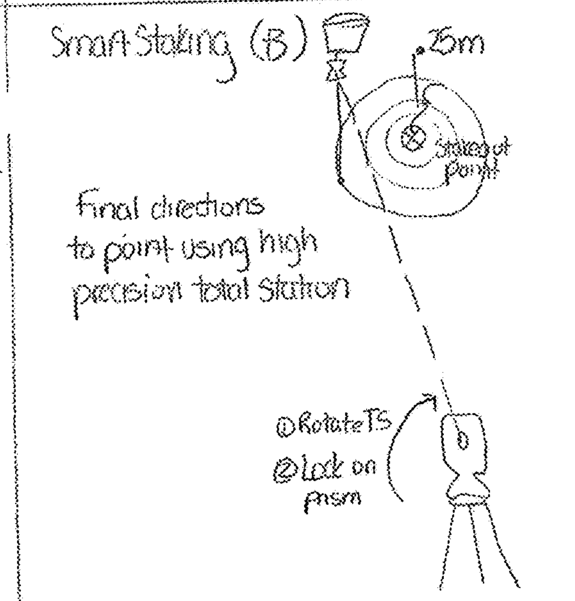
FIG. 15

HYBRID TOTAL STATION WITH ELECTRONIC LEVELING

RELATED APPLICATION

This application claims priority and is a Continuation-In-Part of U.S. patent application Ser. No. 14/730,900, now U.S. Pat. No. 10,101,459 entitled GNSS Mobile Base Station and Data Collector with Electronic Leveling, filed on Jun. 4, 2015, and which claims the benefit of U.S. Provisional Patent Application Ser. No. 62/008,933, entitled GNSS Mobile Base Station and Data Collector with Electronic Leveling, filed on Jun. 6, 2014, the contents all of which are incorporated herein by reference in their entirety for all purposes.

BACKGROUND

Technical Field

This invention relates to surveying, and more particularly to a robotic total station and prism rover with a GNSS tracking and locking system that combines the positioning of a GNSS receiver with the robotic total station to replace or supplement optical tracking of the rover.

Background Information

A total station, also referred to as a total station theodolite, is a surveying tool that uses an electronic theodolite (transit) in conjunction with an electronic distance measurement (EDM) device to read slope distances and angles from the instrument to a particular spot. An on-board computer is used to collect data and, along with other technology such as mapping software, to deliver the 'total' surveying package, from measuring to mapping. Measurement of distance is accomplished with a modulated infrared carrier signal, generated by the EDM, and reflected by a prism reflector (retroreflector) or the object under survey. The modulation pattern in the returning signal is read and interpreted by the computer in the total station.

Total station based systems are known for providing the highest possible degree of accuracy for site positioning, stakeout, grade checking and measurement. So although their range is more limited than GNSS-based systems, total station-based systems are understood to be better suited for projects where high accuracy is a key factor. They are generally considered ideal for sites where the accuracy requirements are very tight.

A robotic total station (RTS) allows the operator to control the instrument from a distance via remote control. This eliminates the need for an assistant staff member as the operator holds the prism and controls the total station from the observed point. For example, the robotic controller can stream the Total Station's view to a surveyor at a remote point, who can make measurements and change the target area without returning to the Total Station.

Conventional surveying with a robotic total station has been dependent upon optical tracking of the prism by the RTS. This allows the total station to maintain continuous distance measurements to the prism. This conventional approach, however, has drawbacks. For example:

1) Optical tracking consumes a great deal of power and reduces battery life of the RTS.
2) Optical tracking requires line of sight between the prism and the robotic total station. For instance, walking behind a tree or other object may break the tracking and require a time-consuming search to restore it.
3) Optical tracking can lock on other reflective objects, such as car windows and safety reflectors on clothing, sometimes even taking measurements to these objects. This results in wasted time and potentially incorrect measurements. This tends to be particularly problematic in parking lots and high traffic surveys.

RTS surveying procedures involve using at least one stationary RTS/tripod and at least one moving retroreflector (prism) mounted on a roving range pole. It is noted that conventional approaches require both the RTS/tripod and the roving pole to be properly leveled during data capture in order to provide desired accuracy. This leveling is conventionally provided by the use of conventional bubble levels mounted on these devices. This conventional leveling approach generally suffices for the RTS/tripod due to its stationary use. However, this approach tends to be cumbersome for the rover, because it generally requires the user to stop, observe the bubble level on the pole in order to move the pole to proper vertical orientation, and then hold the pole in position while looking away from the pole to a data collector to capture the data. This leveling process is repeated at each data collection location throughout the work site.

A need exists for an improved system and method to address the foregoing drawbacks and facilitate RTS data collection.

SUMMARY

According to an aspect of the invention, a Robotic Total Station (RTS) system includes an RTS disposed for at least two-axis rotation on a tripod, and a rover including a prism supported by a range pole, and GNSS receiver disposed on the range pole at a fixed distance from the prism, the GNSS receiver configured to generate three-dimensional location data (GNSS-derived position measurements) for the GNSS receiver. The RTS is configured to rotate on the tripod to point towards the rover and generate an RTS-position measurement of the rover by transmitting and capturing a reflection of an optical signal from the prism. Inclination sensors disposed on the range pole in operative engagement with the GNSS receiver generate inclination data for the range pole along mutually orthogonal x and y axes. A hand-held data collector computer is configured to generate a data collection graphical user interface (GUI) visible on a display, and is communicably coupled to the GNSS receiver to receive the three-dimensional location data and inclination data for the range pole in real-time. The RTS is communicably coupled to the data collector and/or the GNSS receiver, to receive and use the GNSS-derived position measurements and the inclination data in real-time to automatically track and point the RTS towards the prism. A virtual level component implemented by the data collector computer uses the inclination data to display real-time tilt information for the range pole in the form of a virtual bubble level indicator. The virtual level component is configured to use the inclination data along with the height of the range pole to calculate and display with the GUI, a horizontal distance and direction to move the top of the range pole to level the GNSS receiver, wherein the horizontal distance is calculated using the formula:

$$\text{incline}=a\cos(\cos(x\_\text{tilt})*\cos(y\_\text{tilt}))\text{where,}$$

xtilt=the inclination data for the range pole along the x axis, ytilt=the inclination data for the range pole along the y axis, and $$\text{horizontaldistancefromlevel}=rh*\sin(\text{incline})$$

where, rh=the height of the range pole.

According to another aspect of the invention, a Robotic Total Station (RTS) method for data collection includes disposing an RTS for at least two-axis rotation on a tripod, and configuring a rover to include a prism and GNSS receiver disposed on a range pole at a fixed distance from one another, the GNSS receiver configured to generate three-dimensional location data (GNSS-derived position measurements) for the GNSS receiver. The method includes configuring the RTS to rotate on the tripod to point towards the rover and generate an RTS-position measurement of the rover by transmitting and capturing a reflection of an optical signal from the prism. Inclination sensors generate inclination data for the range pole along mutually orthogonal x and y axes, and a hand-held data collector computer including a data collection module is configured to generate a data collection graphical user interface (GUI) on a display. The data collector is communicably coupled to the GNSS receiver to receive from the GNSS receiver, the three-dimensional location data and the inclination data for the range pole in real-time. The RTS is communicably coupled to the data collector and/or the GNSS receiver to receive and use the GNSS-derived position measurements and the inclination data for the range pole in real-time, to automatically track and point the RTS towards the prism. A virtual level component of the data collector computer uses the inclination data to display on the GUI real-time tilt information for the range pole in the form of a virtual bubble level indicator. The data collector computer uses the inclination data along with the height of the range pole to calculate and display with the GUI, a horizontal distance and direction to move the top of the range pole to level the GNSS receiver, wherein the horizontal distance is calculated using the formula:

$$\text{incline}=a\cos(\cos(x\_\text{tilt})*\cos(y\_\text{tilt}))\text{where,}$$

xtilt=the inclination data for the range pole along the x axis, ytilt=the inclination data for the range pole along the y axis, and $$\text{horizontaldistancefromlevel}=rh*\sin(\text{incline})$$

where, rh=the height of the range pole.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which:

FIG. 12 is a schematic view illustrating a method in accordance with embodiments of the present invention;

FIG. 13 is a is a schematic view illustrating a method in accordance with embodiments of the present invention;

FIG. 14 is a schematic view illustrating a method in accordance with embodiments of the present invention;

FIG. 15 is a schematic view illustrating a method in accordance with embodiments of the present invention.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

As used in the specification and in the appended claims, the singular forms "a", "an", and "the" include plural referents unless the context clearly indicates otherwise. For example, reference to "an analyzer" includes a plurality of such analyzers. In another example, reference to "an analysis" includes a plurality of such analyses.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

Figure 1:
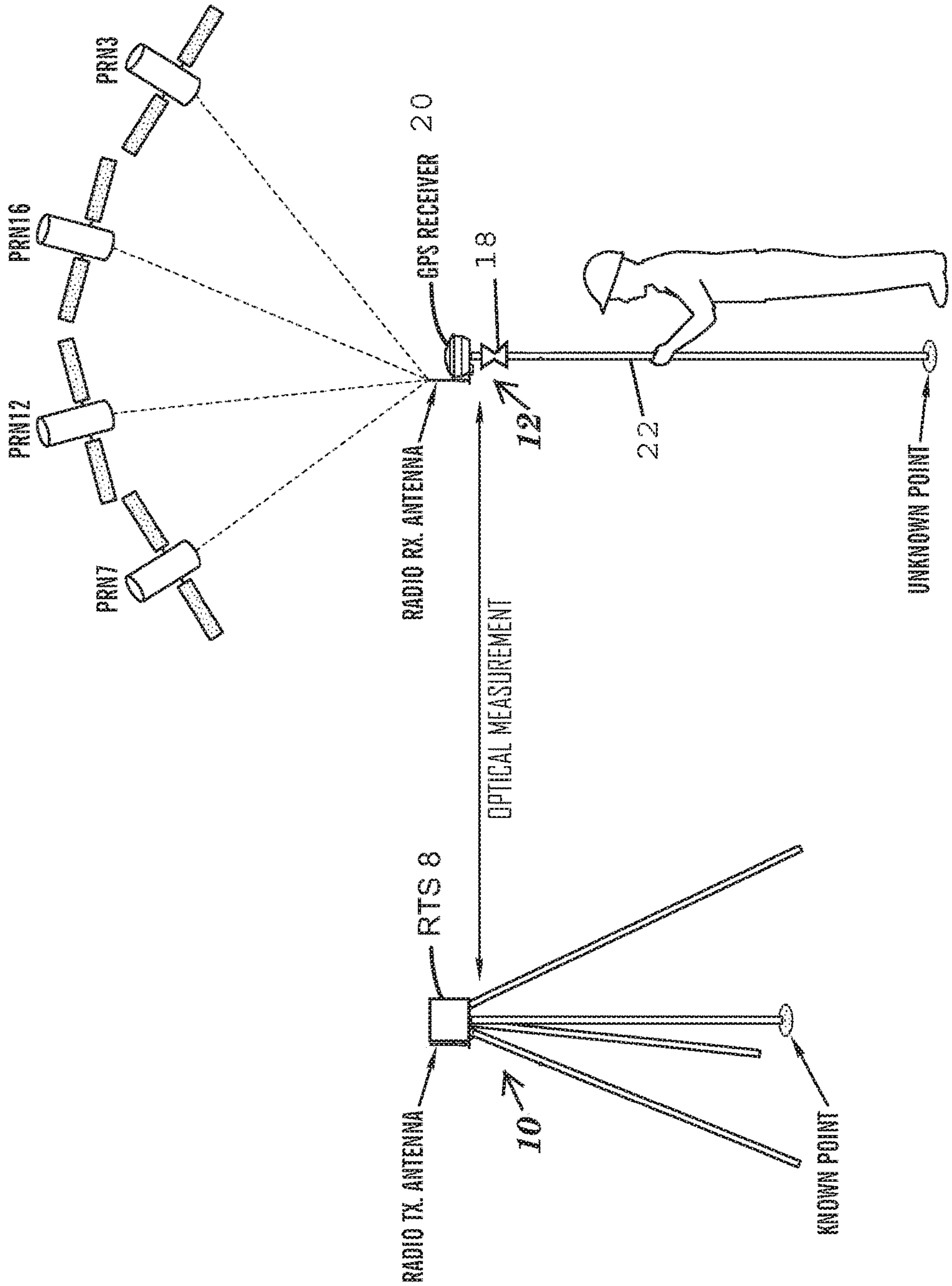
FIG. 1 is a schematic view of an RTS data collection system in accordance with embodiments of the present invention.
Figure 3:
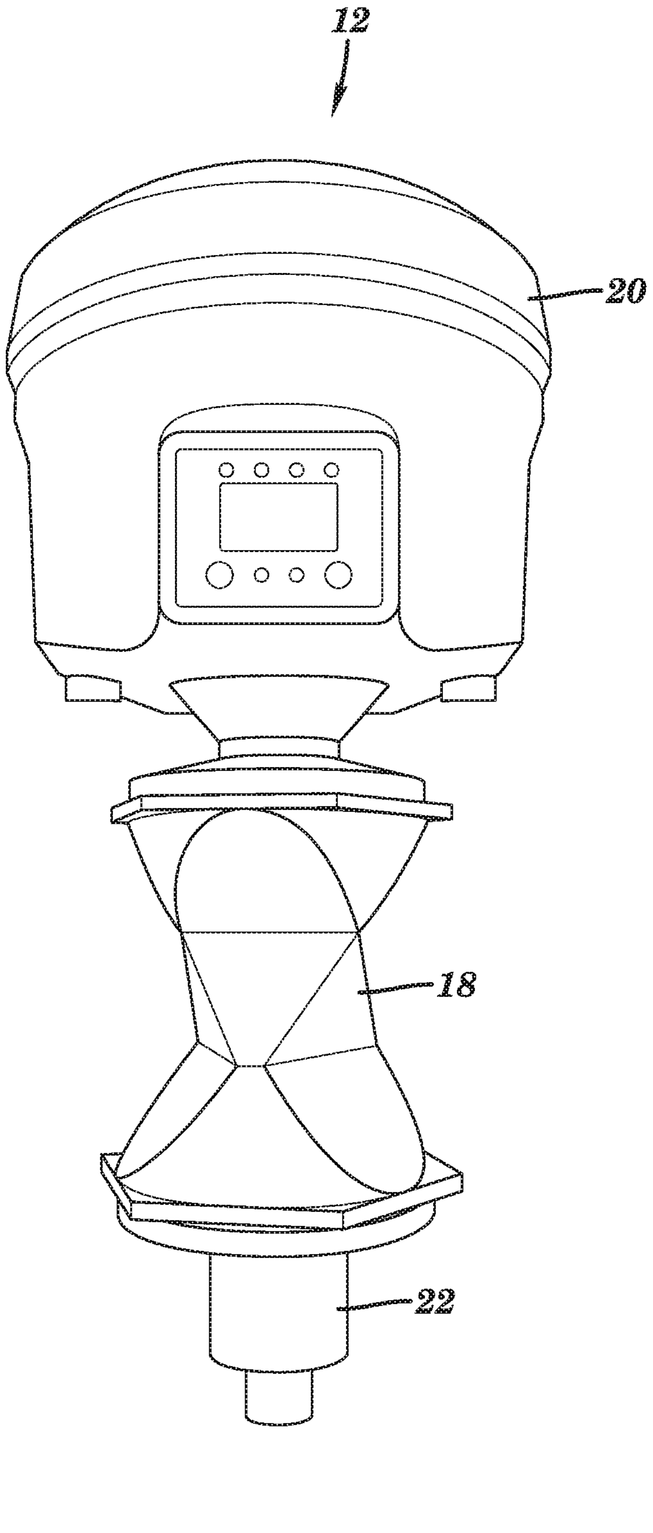
FIG. 3 is an elevational view of elements of an embodiment of the present invention.

Briefly described, embodiments of the present invention include a RTS system that uses GNSS tracking and locking to replace or supplement optical tracking to address the foregoing drawbacks. As shown in FIG. 1, in these embodiments a GNSS-enabled RTS 8 rotatably supported, e.g., for at least two-axis rotation, by a RTS/tripod 10, which is used in combination with a rover 12 having a prism 18 disposed at a fixed offset from a GNSS receiver 20 on a pole 22 (FIG. 3). These embodiments also include a data collector 24 (FIG. 5) that may be handheld or disposed on the pole 22.

These embodiments use GNSS Tracking to replace or supplement conventional optical tracking by continuously orienting the RTS 8 towards rover 12 (and its prism 18) as the rover 12 moves. This is achieved by using GNSS to locate the position of receiver 20, factor in the offset between receiver 20 and prism 18, and any inclination data as discussed hereinbelow, and then pointing RTS 8 to that location. Using this method, there is no longer a need to maintain a line of sight between the prism and the total station while tracking. The user can pass behind obstructions such as buildings and trees and still be ready to take a measurement upon re-emerging without a lengthy search, because the total station remains ready and pointed at the prism using the location of the GNSS receiver 20. In particular embodiments, the conventional optical tracking feature of commercially available robotic total stations is disabled during GNSS tracking to help eliminate the potential to lock or take faulty measurements on stray reflectors.

Figure 2:
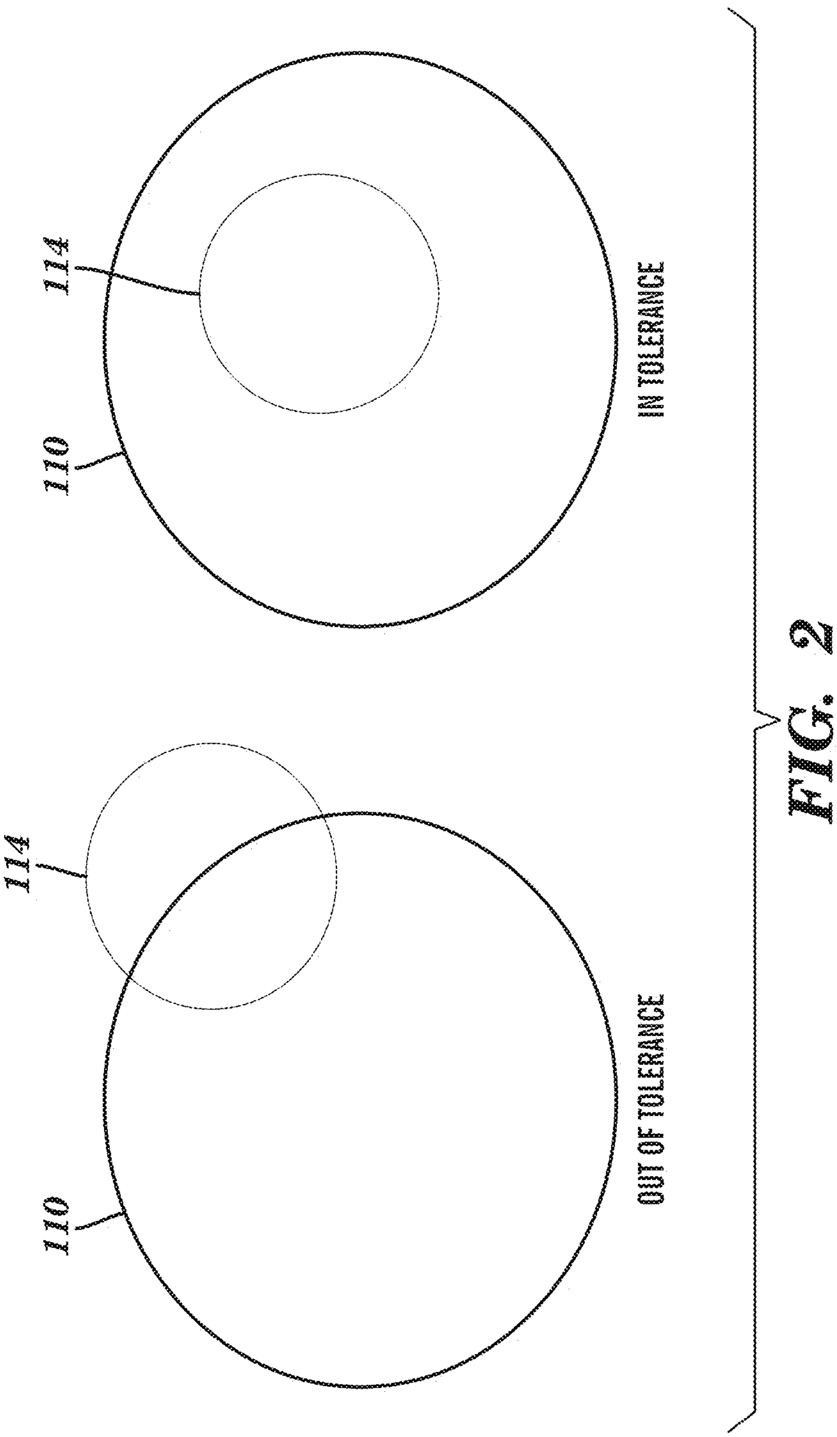
FIG. 2 is a schematic view of a display in accordance with an embodiment of the present invention.
Figure 5:
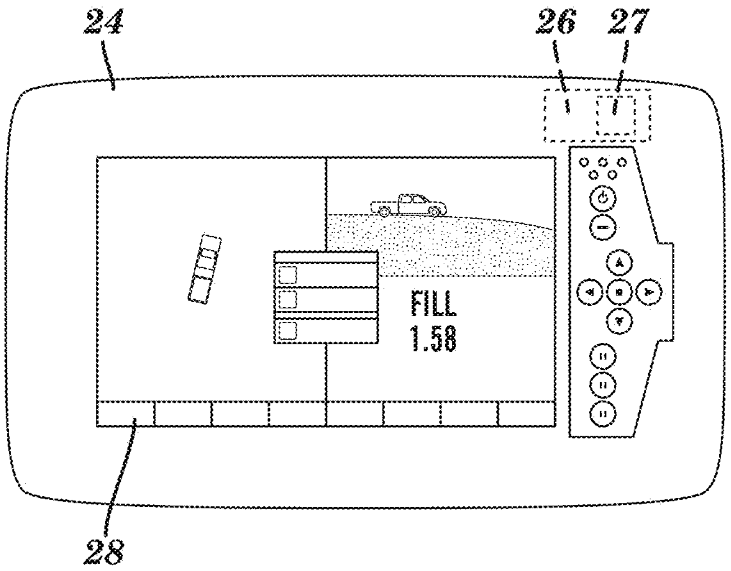
FIG. 5 is a schematic view of yet other elements of the present invention.

Optionally, in particular embodiments, the data collector 24 captures and displays real-time tilt information for the rover 12 in the form of a virtual bubble level indicator on a Graphical User Interface (GUI) 28 (FIG. 5). As shown in FIG. 2, the GUI 28 displays a tolerance bubble 114 relative to a circle (leveling viewer) 110 corresponding to a target position. The bubble 114 moves in real-time as the range pole 22 (FIGS. 1&3) supporting the GNSS receiver 20 is tilted. If the bubble is "inside" the circle, then the pole is sufficiently oriented (e.g., within tolerance) for desired accuracy, and data collection may commence. In the example shown, the bubble turns green or otherwise indicates proper pole orientation. As also shown, when the bubble is outside the circle, the pole position is out of tolerance, and may be turned red or may otherwise alert the user than data should not be collected until the position of the pole is properly oriented. In particular embodiments, the system is configured to selectively capture and prevent the capture of data depending on the orientation of the pole 22, e.g., automatically capturing data when the pole is properly oriented, and preventing data capture when the orientation of the pole is out of tolerance. Moreover, as discussed in greater detail hereinbelow, the GUI 28 displays the horizontal distance and direction the top of the pole may be moved to level the GNSS receiver 20 (by moving the pole into a vertical position).

In the following description, for purposes of explanation, numerous specific details are set forth in order to provide a thorough understanding of the present invention. It will be evident, however, to one skilled in the art that the present invention may be practiced without these specific details.

As used herein, the terms "computer" and "end-user device" are meant to encompass a workstation, personal computer, personal digital assistant (PDA), wireless telephone, or any other suitable computing device including a processor, a computer readable medium upon which computer readable program code (including instructions and/or data) may be disposed, and a user interface. The term "real-time" refers to sensing and responding to external events nearly simultaneously (e.g., within milliseconds or microseconds) with their occurrence, or without intentional delay, given the processing limitations of the system and the time required to accurately respond to the inputs.

Terms such as "component," or "module", and the like are intended to refer to a computer-related entity, either hardware, a combination of hardware and software, software, or software in execution. For example, a module or component may be, but is not limited to being, a process running on a processor, a processor, an object, an executable, a thread of execution, a program, and a computer. By way of illustration, both an application running on a server and the server (or control related devices) can be modules. One or more modules may reside within a process and/or thread of execution and a module may be localized on one computer and/or distributed between two or more computers or control devices.

Programming Languages

The system and method embodying the present invention can be programmed in any suitable language and technology, such as, but not limited to: C++; Visual Basic; Java; VBScript; Jscript; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400.

Referring now to the figures, embodiments of the present invention will be more thoroughly described.

As mentioned above, embodiments of the present invention enable the RTS 8 to efficiently track the prism 18 during optical surveying even when the RTS loses sight of the prism, such as when going behind trees, going behind buildings, etc. To those skilled in the art, this approach tends to be counter-intuitive due to concerns with the potentially large amount of data that would necessarily be handled with limited communications bandwidth. The skilled artisan would be reluctant to use an approach requiring a great deal of communication due to concerns about potential communication and processing delays. The instant inventors, however, have devised an approach that is tolerant of communication and processing delays, without sacrificing accuracy of collected data. The present inventers have provided these benefits by implementing a hybrid of optical and GNSS (GPS)-enabled surveying, for enhanced optical surveying.

The inventors have recognized that pure GNSS-based surveying is useful in many applications, such as on dirt, i.e., on unimproved sites. The inventors have also recognized that in many other applications, such as when surveying hard structures, optical instruments are desired, due to greater accuracy. For example, the inventors have recognized that when using GNSS, vertical measurements have twice the error of horizontal measurements, so that a one centimeter error on the horizontal corresponds to a two centimeter error on the vertical. GNSS surveying errors of about 400s and 800s are considered acceptable RTK (Real Time Kinematic) accuracy. This level of accuracy, however, may be insufficient for some applications. One such example is staking an outfall pipe. Outfall pipes use a very slight slope, e.g., a tenth of a percent, or two-tenths of a percent. These big pipes can't have a lot of fall (i.e., slope), because too much inertia in the flowing fluid may rupture the pipe when the fluid gets to where it's going. So if staking this pipe every hundred feet, and at one point the error is 800s below, and on the next, the error is 800s high, i.e., within acceptable tolerance of GNSS-enabled RTK surveying, then the pipe may not have the sufficient slope for the fluid to flow, or may have too much slope to flow without gaining excessive momentum. Similarly, GNSS-enabled approaches would tend to be too inaccurate for staking hard structures like asphalt, gutters, piping, settings for anchor bolts in concrete, etc.

Figure 4:
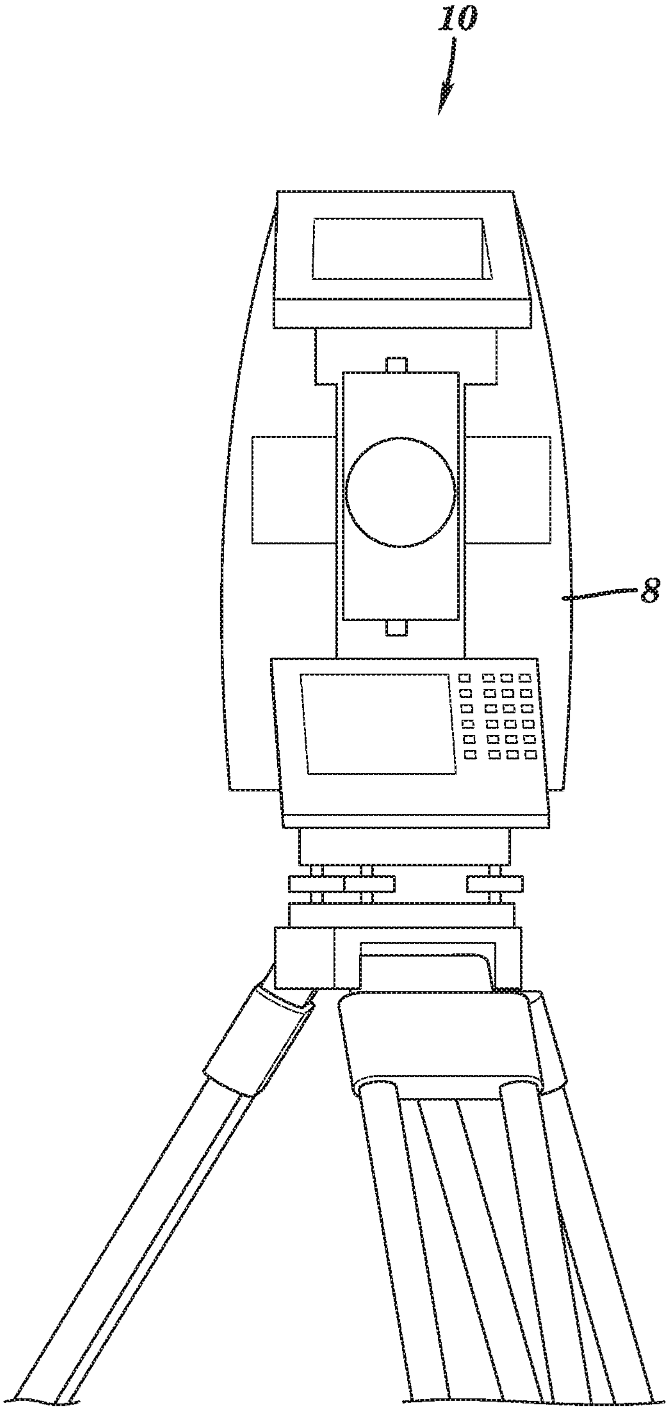
FIG. 4 is an elevational view of other elements of an embodiment of the present invention.

Turning to FIG. 3, particular embodiments of the present invention include a GNSS receiver 20, such as the BRx6 Mobile Base Station available from Carlson Software, Inc. of Maysville, Ky., USA ("Carlson"), mounted above a conventional surveying prism (retroreflector) 18 on top of a range pole 22. These embodiments also include a data collector 24 (FIG. 5) in the form of a handheld computer such as the Carlson RT3™ Rugged Tablet PC, running surveying data collection software (data collection module) 26 such as SurvCE®, both of which are available from Carlson. As shown in FIG. 4, particular embodiments also include a GNSS-enabled RTS 8, such as the CR®+ robotic total stations available from Carlson, supported for at least two-axis rotation (e.g., pitch and yaw) by a conventional tripod. As shown in FIG. 1, receiver 20 (and optionally RTS 8) is configured to calculate its own position using GNSS satellites. Receiver 20 and RTS 8 are also configured to wirelessly communicate with one another, e.g., directly and/or via data collector 24, e.g., by Bluetooth®, cellular, or WiFi communications. This combination of GNSS positioning and wireless communication enables receiver 20 to send its current location (GNSS coordinates) to RTS 8 (directly and/or via data collector 24) by which RTS 8 is able to track the location of rover 12 as it is moved.

Figure 6A:
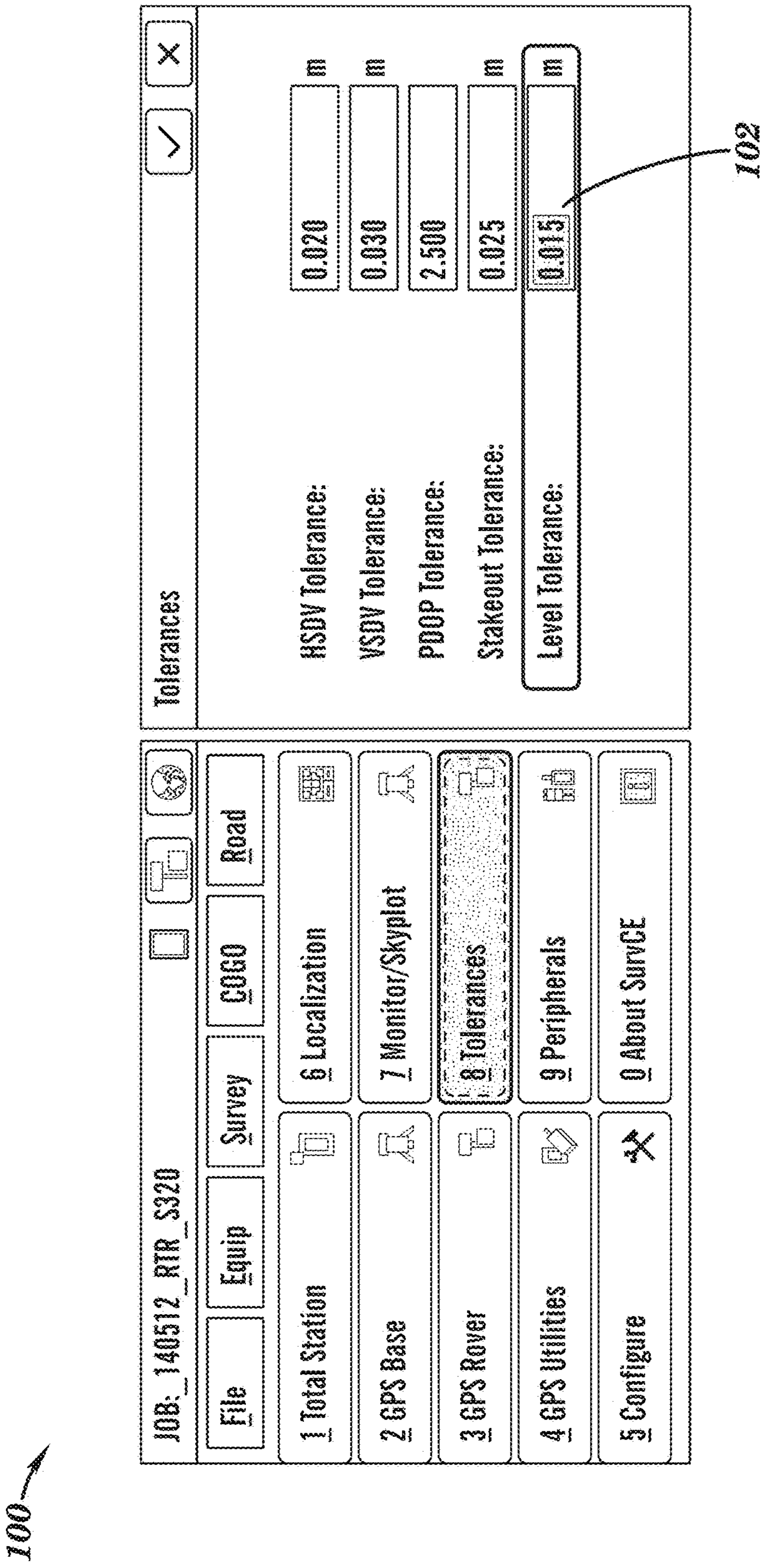
FIG. 6A is a view of a graphical user interface display of an embodiment of the present invention.
Figure 6B:
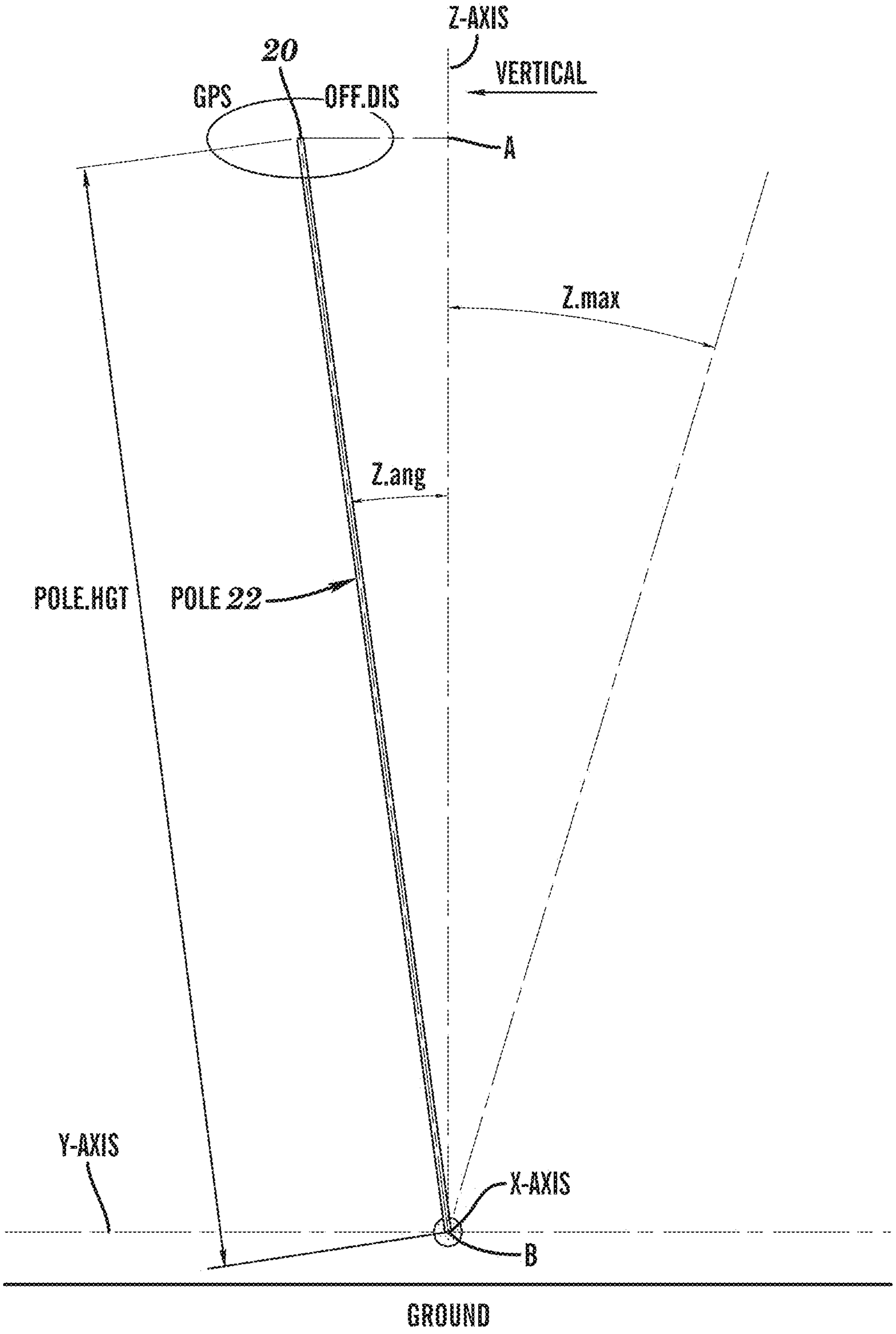
FIG. 6B is a schematic elevational view of aspects of an embodiment of the present invention with coordinate axes.
Figure 6C:
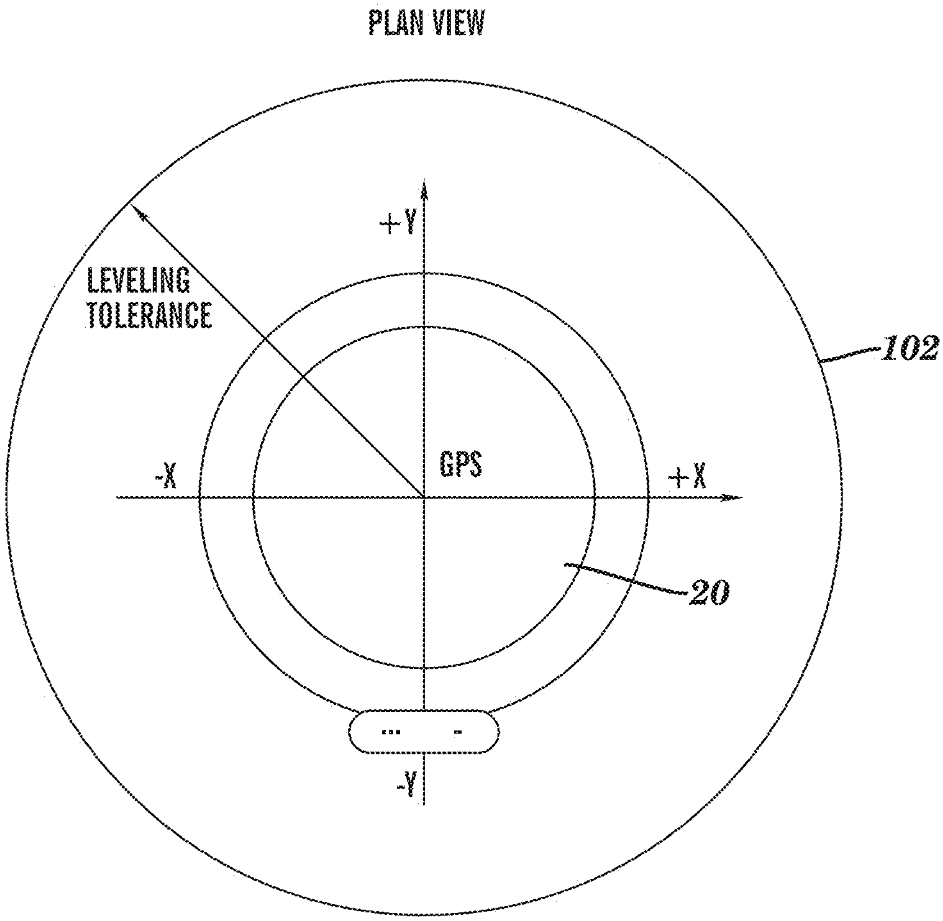
FIG. 6C is schematic plan view of an embodiment of the present invention with coordinate axes.
Figure 16:
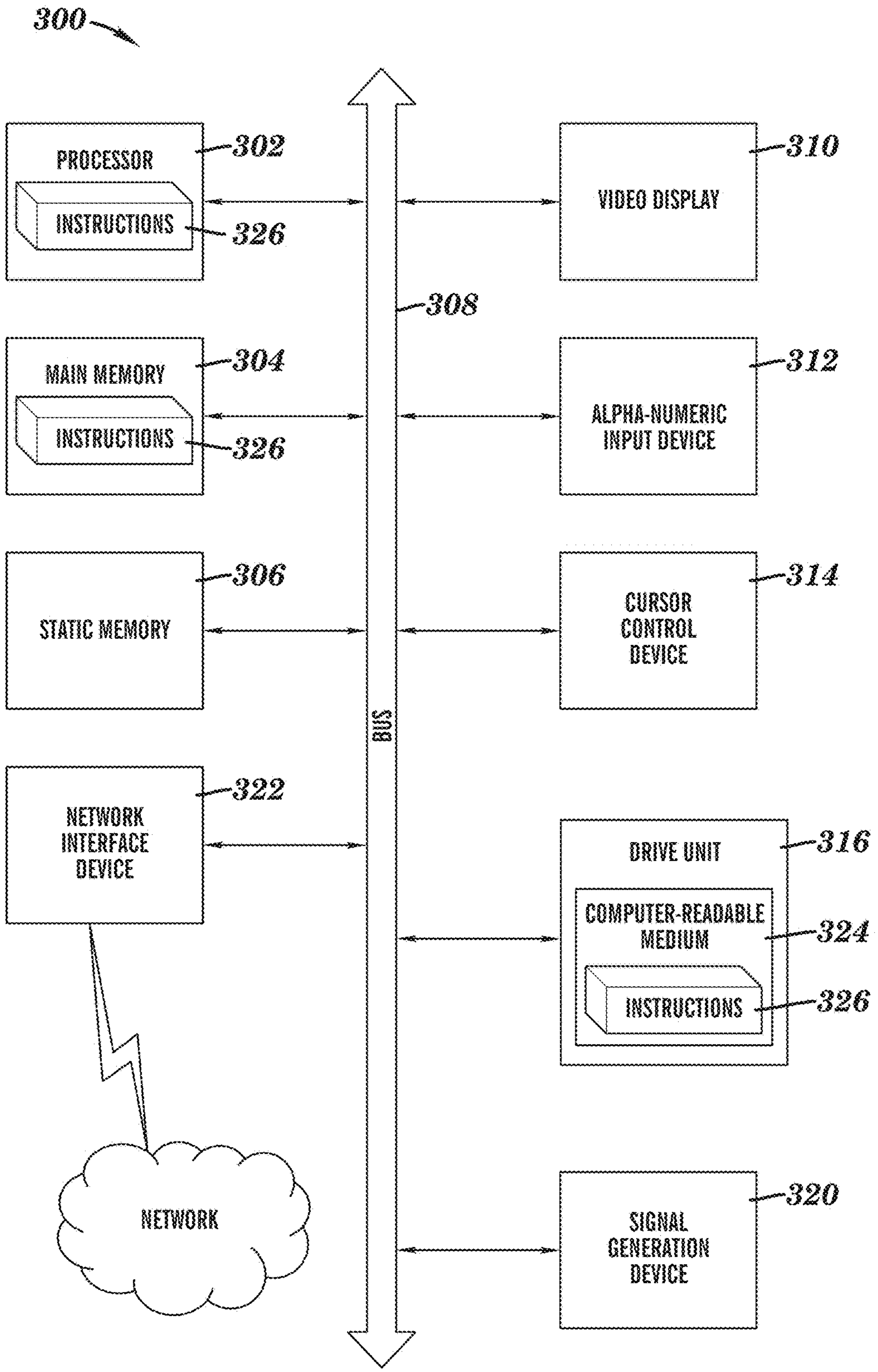
FIG. 16 is a block diagram of one embodiment of a computer system usable with embodiments of the present invention.

As mentioned hereinabove, in particular embodiments, receiver 20 includes integral electronic tilt sensors, which provide a reading of the tilt on the instrument on two axes, (left-right, and forward-back, sometimes called pitch and yaw, or simply tilt along the x and y axes as shown in FIG. 6C). Examples of such tilt sensors include the CarlsonDual Axis/Angular Sensor, available from Carlson. The instrument 20 transmits these x-y tilt readings to the data collector (e.g., handheld computer) 24. The data collector receives the tilt readings, along with the positional data (latitude, longitude, elevation, etc.) from the GNSS receiver 20. The data collection module 26 (e.g., SurvCE software) uses these x-y tilt measurements along with the length of the range pole 22 (e.g., the pole height as shown in FIG. 6B) to calculate the horizontal distance by which the receiver 20 is out of level, and/or to compensate for the tilt of the pole 22 during data collection to calculate the location on the ground beneath the receiver 20 as discussed in greater detail hereinbelow. It should be recognized that in particular embodiments, module 26 does not merely calculate and display the x-y tilt measurements as angular values, i.e., as the angular degree of tilt (z angle, FIG. 6B) along the x and y axes relative to vertical. Rather, module 26 may use the captured tilt data, along with the length of the pole 22 supporting the receiver 20, to calculate the horizontal distance and direction of movement required to level the GNSS receiver 20. These values are displayed to the user on GUI 28, e.g., graphically, in the form of the e-bubble level of FIGS. 7-9, and/or numerically, by virtual level component 27 (e.g., of the SurvCE software). This distance information may also be stored with captured raw data, e.g., in memory 304/306 (FIG. 16) of data collector 24, for Quality Control/Quality Assurance or post-processing.

In particular embodiments, the following formulae are used to calculate the location on the ground beneath the receiver 20 by applying the above-referenced tilt measurements:

1) Calculation of ground point beneath the prism 18, by applying the output of the tilt sensors of receiver 20 to the prism location measurements generated by RTS 8:

Input:

Surveyor pole 22 position on ground as measured from the total station, assuming level pole: ts_x, ts_y, ts_z Rod height of total station: ts_rh (measured from RTS 8 to the ground)

tilt of receiver 20: gps_xtilt, gps_ytilt orientation of receiver 20: gps_orientation Output:

Surveyor pole 22 position on ground as measured from the total station, but taking into account the sensors of receiver 20: ts_x_adjusted, ts_y_adjusted, ts_z_adjusted;

Calculation:

$$\text{incline}=a\ \cos(\cos(gps\_x\text{tilt})*\cos(gps\_y\text{tilt}));$$

$$\text{dist}=ts\_rh*\sin(\text{incline});$$

$$y\_\text{offset}=\text{dist}*\cos(gps\_\text{orientation});$$

$$x\_\text{offset}=\text{dist}*\sin(gps\_\text{orientation});$$

$$\text{new}\_z=ts\_rh*\cos(gps\_x\text{tilt})*\cos(gps\_y\text{tilt});$$

$$z\_\text{offset}=ts\_rh-\text{new}\_elv;$$

$$ts\_x\_\text{adjusted}=ts\_x+x\_\text{offset};$$

$$ts\_y\_\text{adjusted}=ts\_y+y\_\text{offset};$$

$$ts\_z\_\text{adjusted}=ts\_z+z\_\text{offset};$$

2) Calculation of tilt adjusted offset of the prism relative to the antenna phase center of the receiver 20:

This calculation is used to point the RTS towards the prism using the location of the GPS, even when the pole is off level. This enables the total station 8 to be pointed to the true location of the prism rather than to a point vertically beneath the receiver 20.

Input:

Location of GPS antenna phase center: apc_x, apc_y, apc_z (output of receiver 20)

Fixed offset between the prism and the measurement point on the GPS receiver: gps_to_prism_offset Fixed offset between the phase center of the GPS antenna and the measurement point of the GPS receiver: L1_Offset tilt of GPS receiver: gps_xtilt, gps_ytilt orientation of GPS receiver: gps_orientation Output:

Location of total station prism: prism_x, prism_y, prism_z

Calculation:

$$\text{prism\_to\_}apc=gps\_\text{to\_prism\_offset}+L1\_\text{Offset};$$

$$\text{incline}=a\ \cos(\cos(gps\_x\text{tilt})*\cos(gps\_y\text{tilt}));$$

$$\text{dist}=\text{prism\_to\_}apc*\sin(\text{incline});$$

$$y\_\text{offset}=\text{dist}*\cos(gps\_\text{orientation});$$

$$x\_\text{offset}=\text{dist}*\sin(gps\_\text{orientation});$$

new_z=prism_to_apc*cos(gps_xtilt)*cos(gps_ytilt);

z_offset=prism_to_apc−new_elv;

prism_x=apc_x+x_offset;

prism_y=apc_y+y_offset;

prism_z=apc_z+z_offset−prism_to_apc;

During exemplary operation of embodiments of the present invention, the user performs optical surveying in a substantially conventional manner, by stopping and leveling up, prior to optically locking onto a point and then capturing data for that point of interest. By the time the user levels up, the RTS has lined up with the prism using the prism's GNSS receiver, because it takes a user a second or two to get the rod level. That's plenty of time for the RTS to optically lock onto the prism because it is has already been pointed towards the prism using the GNSS coordinates provided by the receiver 20. The effect of this approach is that as soon as the rod is level, the system is properly oriented and ready to capture optical measurements while effectively eliminating the possibility of locking onto something like a car headlight of a car going down the highway. Moreover, while the aforementioned calculations (1) and (2) may be used to enable the RTS to accurately track the prism prior to data capture, these calculations may also be used to compensate (i.e., correct) any position data captured by the RTS when the pole 22 was tilted, as will be discussed in greater detail hereinbelow.

Regarding the bubble display, in particular embodiments, the formula shown in the following pseudo code is used to calculate the horizontal distance from level, and whether the range pole/tilt bubble is within tolerance:

input:
Current XTilt: xtilt
Current YTilt: ytilt
User configured tolerance in meters: tol;
RodHeight: rh
Pseudo Code:

incline=a cos(cos(x_tilt)*cos(y_tilt));

distancefromlevel=rh*sin(incline);

if(distancefromlevel>tol) then do not allow the reading to be stored.

This approach makes the e-bubble much more useful in the field than conventional approaches that either fail to quantify the extent to which the device is out of level, or simply provide angle (inclination) information rather than horizontal distance information.

This has a number of potential advantages:

- Tolerance based on horizontal distance from the level (vertical) position, rather than simply angle measurements, enables compensation for different length poles, to provide greater accuracy than prior analog approaches that do not compensate for pole length.
- The operator only has to look at the data collector for both data collection and leveling functions, rather than repeatedly looking back and forth between a data collector and a pole-mounted bubble level.
- The data collection module may calculate/correct accurate position data when the range pole is not exactly vertical.
- Provides for an Auto-by-Interval feature, in which data is automatically captured once the range pole is within level tolerance, e.g., after a predetermined distance or time interval. This should improve surveyor productivity and/or safety, by permitting users to watch their surroundings, e.g., oncoming traffic when surveying roadways, etc., rather than looking at a pole-mounted level. It should be noted that in particular embodiments, the Auto-by-Interval feature does not necessarily store data for the first position captured once the range pole is within tolerance, but rather, the system stores data associated with the most level position of the range pole within tolerance. For instance:
  - A user wants to store a position with the following constraints:
  - (1) the position is more than X distance from the most recently stored position; and
  - (2) the pole must be within level tolerance for Y amount of time.
- Processing speeds are such that multiple data points may be automatically generated and captured once (1) and (2) have been satisfied. When this occurs, the data collector (e.g., SurvCE®) will not simply store the data for the first point that meets criteria (1) and (2), but instead, stores the data captured when the pole had the least amount of tilt (i.e., captures the most level measurement). Moreover, an enhanced version of the Auto-by-Interval (Auto-Store) feature facilitates automatic data capture without any button presses by automatically reducing the incidence of clustered data capture, i.e., unwanted data captures clustered around a particular location.
- Provides for use of audible signals, such as beeps than change frequency as the pole approaches level (similar to a Geiger counter or metal detector).
- Provides for setting a maximum allowable tolerance for the distance the receiver is out of vertical and will signal the user and/or refuse to store points if the instrument is beyond the tolerance. This tends to improve the quality of data collected.
- The GUI provides an uncluttered, easy to read analog-style interface along with level tolerance information, with tolerance in the form of distance from level rather than angles, to permit auto-by-interval surveying and improved accuracy of survey data collection. A pre-programmed calibration routine also compensates for vibrations and other aberrations.

Turning now to FIGS. 6A-11, various aspects of the bubble level display are shown and described in greater detail. As shown in FIG. 6A, GUI 28 includes a new and easy to use Leveling Tolerance Management screen 100, which displays tolerances 102 in linear units (meters or feet). Tolerance 102 represents the maximum horizontal deviation of the GNSS 20 from the vertical (level) position, taking into consideration the position of the Antenna Phase center (which is dependent on the current pole height and antenna L1 offset). Those skilled in the art will recognize that the Antenna Phase center will be offset from the top of the pole to an extent that will vary, in part, depending on the particular make and model of GNSS 20. Therefore, for ease of explication, the discussion herein will assume that the Antenna Phase center is located in the GNSS at the top of the range pole 22, with the understanding that measurements involving the pole length (height) are intended to encompass the pole height plus the actual antenna L1 offset. Tolerances for other GPS variables such as HSDV (Horizontal Standard Deviation), VSDV (Vertical Standard Deviation), PDOP (Position Dilution of Precision, i.e., amount of error), and Stakeout Tolerance, may also be entered as shown at 103, 104, 105 and 106, respectively. Moreover, those skilled in the art will recognize that in particular embodiments, HRMS (Horizontal Root Mean Square) and VRMS (Vertical Root Mean Square) may be used in lieu of HSDV and VSDV, respectively.

Figure 11:
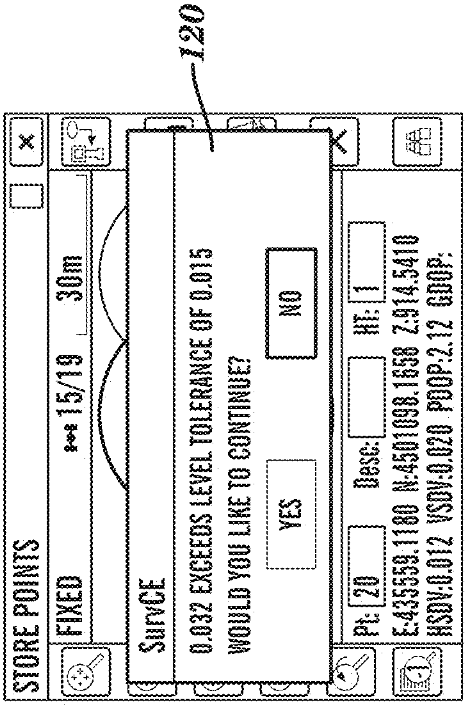
FIG. 11 is a view of a display of a graphical user interface of an embodiment of the present invention.

The linear leveling tolerance is shown relative to the GNSS 20 at 102 of FIG. 6C. And as shown in FIG. 6B, in accordance with the pseudo code shown above, the entered level tolerance 102 (FIG. 6A), along with the length (pole height) of the range pole 22, corresponds to a maximum angular inclination value (z max). In particular embodiments, inclinations of the range pole (z angle) beyond z max/tolerance 102 will generate a warning such as shown in FIG. 11.

Figure 9:
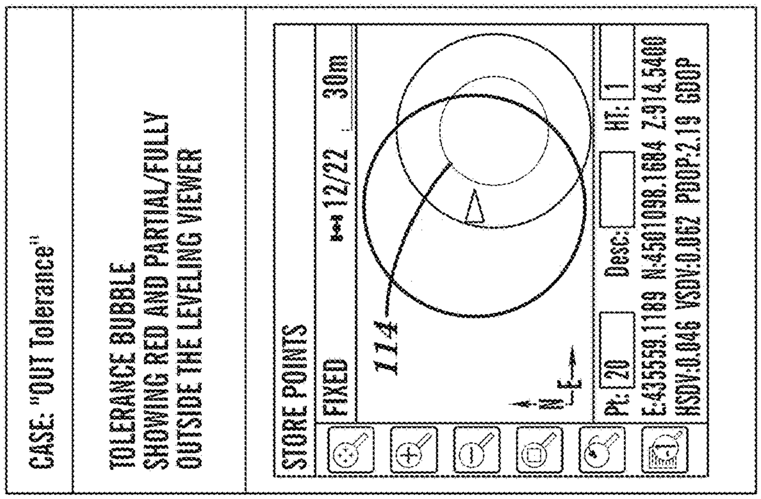
FIG. 9 is a view of a display of a graphical user interface of an embodiment of the present invention.
Figure 8:
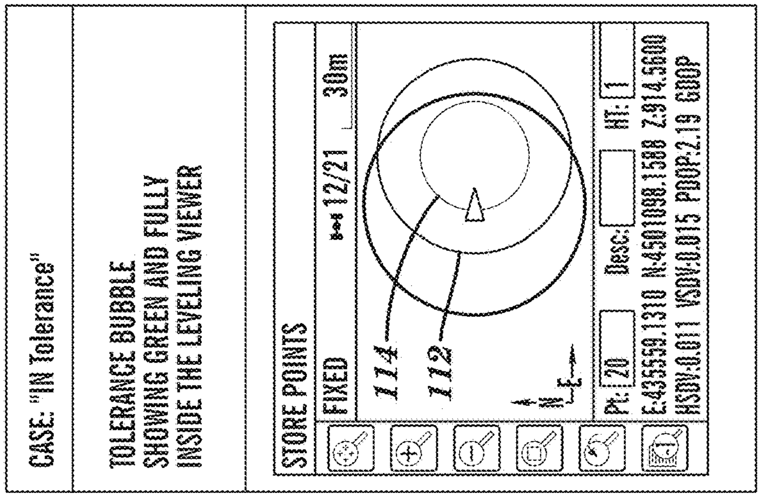
FIG. 8 is a view of a display of a graphical user interface of an embodiment of the present invention.
Figure 7:
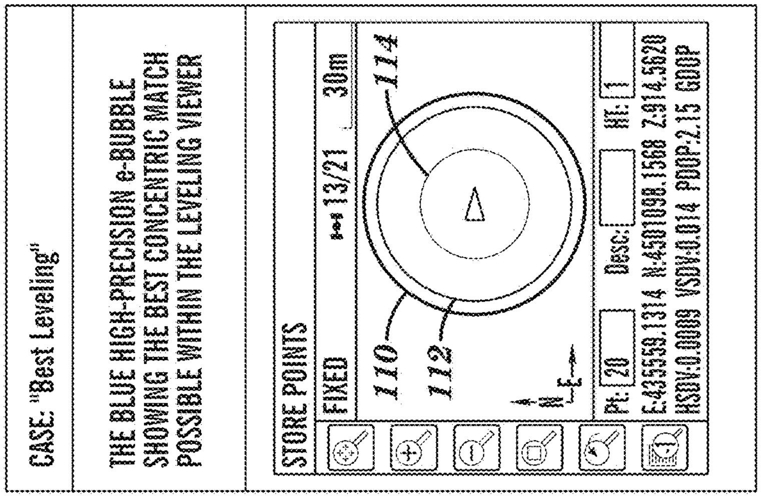
FIG. 7 is a view of a display of a graphical user interface of an embodiment of the present invention.

Turning now to FIGS. 7-9, GUI 28 includes an Accurate Electronic Leveling Device (Leveling Viewer) which in some respects, emulates conventional spherical-glass bubble levels used on range poles, by providing a:

Leveling viewer (fixed black circle) 110; and

A Tolerance e-Bubble (small moving green/red circle) 114 to advise the user when the verticality requested is acquired before storing the new point.

And, unlike a conventional bubble level, the Leveling Viewer also includes a High-Precision e-Bubble (blue moving circle) 112 for fine leveling adjustment.

Operation of these features, including "Best Leveling", "In Tolerance" and "Out of Tolerance" conditions, are shown in FIGS. 7, 8 and 9, respectively. In FIG. 7, the Blue High-Precision e-bubble 112 shows the best concentric match possible within the Leveling Viewer. In FIG. 8, the Tolerance bubble 114 shows Green and is fully inside the Leveling viewer, to indicate that while the pole 22 is not in optimal position, it is still within tolerance and therefore acceptable for data collection. In FIG. 9, the Tolerance bubble 114 is Red and extends at least partially outside the Leveling viewer, indicating that data should not be collected.

Figure 10:
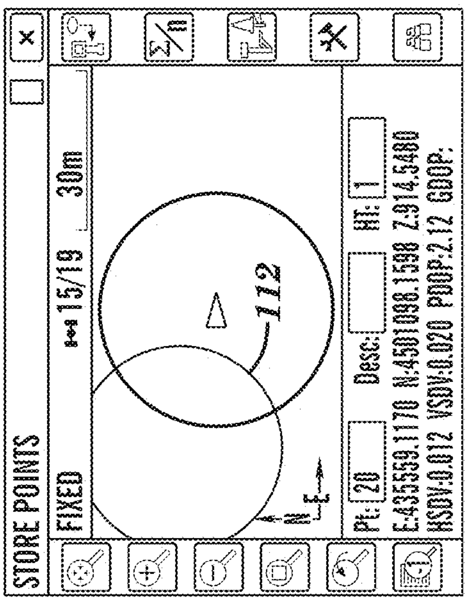
FIG. 10 is a view of a display of a graphical user interface of an embodiment of the present invention.

Turning now to FIG. 10, in particular embodiments, GUI 28 includes Auto-Adaptable Leveling Sensibility, in which the in-graphics relation of pixel/resolution to tilt-angle changes depending on: Current user-defined Leveling Tolerance; Current user-defined Antenna height (L1 offset automatically included); and On screen Graphics size and resolution. This means that the lower the tolerance setting, the higher the sensitivity perceived by the user. It should be recognized that the same tolerance setting makes leveling more sensitive when using higher poles 22, in order to preserve the Maximum Linear Deviation (millimeter or inches) set by the user. During use of the leveling function, whenever the pole 22 is tilted too much, the user may be advised by: the Tolerance Bubble not showing, and/or the Hi-Precision Bubble 112 getting "locked" at the maximum deviation, while remaining visible on the screen and located on the screen in the direction of tilt of the pole, so the user can easily identify the direction of movement required to bring the pole back into the vertical position.

As shown in FIG. 11, various embodiments may include a Leveling Tolerance Check screen 120 implemented in Store Points and Stakeout modes of operation. Similar to the "Stakeout Tolerance Check", the software will warn the user and wait for his validation before storing a point when the current tilt of the pole exceeds the tolerance set by the user.

Turning now to FIGS. 12-15, exemplary applications for these embodiments include:

Gathering Data/Surveying (1) GNSS Tracking: As shown in FIG. 12, GNSS tracking replaces optical tracking by using GNSS coordinates to rotate the total station continuously to prism. This is achieved by locating the position of the GNSS receiver 20, e.g., using Calculation (1) described hereinabove, calculating the offset to the prism such as using Calculation (2), then instructing RTS 8 to turn to that location. Using this method, there is no longer a need for line of sight between the prism and the total station during tracking. The user can walk behind buildings and trees and still be ready to take an optical RTS measurement without a lengthy search, because the total station is ready and pointed towards the prism using the GNSS coordinates of receiver 20. Moreover, this approach enables optical tracking on the RTS 8 to be disabled, to nominally eliminate the possibility of locking onto stray reflectors.

(2) Smart-Locking: As shown in FIG. 13, in order to conserve battery life, a secondary feature called smart-locking may be used. For most conventional topographical work, a continuous position stream is not required. The surveyor walks from position to position collecting points, with the primary requirement being that the total station be ready to take a measurement when the surveyor gets to a desired location. Using traditional optical tracking, the prism is often lost while he is walking, and an undesirably long search is required to regain the lock upon reaching the target point. This smart lock method addresses this problem using the position information generated by GNSS receiver 20. In this embodiment, data collection module 26 monitors the velocity of the GNSS receiver 20 as it moves, waiting for the velocity to drop (decelerate) below a predetermined level. Once such a level is reached, the data collection module 26 knows that the surveyor is slowing to take a measurement, and then instructs RTS 8 to turn to the location of the prism 8 and lock on and thus be ready to take a measurement nominally as soon as the surveyor comes to a complete stop (and optionally levels pole 22). This approach conserves battery life of the RTS 8 by eliminating optical tracking when the surveyor is walking between points, and saves the surveyor from having to press a button and trigger a time consuming search upon reaching the target. The total station is thus ready when the surveyor needs it, without interaction from the surveyor.

(3) In conjunction with the foregoing, the user may set a tolerance 102 (FIG. 6A) for the level bubble (e.g., 2 centimeters) and then store only when the bubble is within tolerance. If the green circle 114 is inside the larger circle (leveling viewer 110), the system is within tolerance. (Note that the outer black circle 110 is the same size no matter how close we are zoomed in or how far we are zoomed out—we could be seeing a screen of 8'×10' or 80'×100', this GUI screen still operates similarly.) Moreover, it should be noted that in particular embodiments the rod height used to calculate and display the bubble level will be the rod height to the GNSS receiver 20 when the GNSS is the active instrument on the screen (i.e., when the GNSS is being used to determine the position for storing), and the rod height to prism 18 is used when the RTS 8 is the active instrument on the screen (i.e., when the RTS is being used to determine the position for storing). This approach ensures that the offset between the GNSS receiver 20 and the prism 18 is accounted for even in the bubble display and associated calculations.

(4) In the command Auto-by-Interval, data may be automatically captured at a 10 meter horizontal interval distance or by time (e.g., every 5 seconds). In particular embodiments, the system will automatically prevent data from being captured at the desired interval if the GNSS 20/range pole 22 is tilted beyond tolerance 102. No button pressing is required, just auto-detection of the system being within tolerance 102. Optionally, a Geiger counter-like audio clicking or other varying frequency may be used to guide the user to the level condition (beeps slower if less level, faster if more level, then goes single tone when level). In this manner, the system provides for "never look down" surveying, e.g., silence until the system has reached moved at least the required interval, then the system beeps with increasing frequency as the pole is leveled, until emitting a steady tone at which time the location data is captured, then the system is moved forward and the process repeated.

It should also be recognized that in particular embodiments, the Auto-by-Interval feature may be optionally configured to permit data capture any time the GNSS is within tolerance 102, e.g., regardless of whether or not a particular distance or time interval as passed. This option provides experienced users with greater flexibility, such as to enable data to be captured based on local topography without being constrained by other intervals. For example, a user could move to the top of a ridge or other topographical feature, and then level the pole to automatically capture data. It should also be recognized that any of these Auto-by-Interval features, whether or not the aforementioned audio feature is used, provides for "never look down" or simply "no distraction" data capture, to advantageously permit users to focus their attention on other matters, such as local vehicular traffic when surveying roadways, etc., for increased user safety relative to conventional approaches which require users to focus on pole-mounted levels during data capture.

(5) Using the inclination (tilt) data, particular embodiments may provide data correction, to enable data collection even when the pole is tilted beyond tolerance. For example, the tilt data may be used in combination with directional data (e.g., provided by an electronic compass or magnetometer), to compute position based on tilt angle and azimuth of the tilt. In this example, a directional sensor in addition to the tilt sensors is used to provide data correction, namely, to enable data collection even when the pole is tilted beyond tolerance. The pseudo code shown above, along with the directional information provided by the electronic compass, may be used to calculate and store the position "A" (FIG. 6B) corresponding to the vertical elevation of GNSS 20 above the bottom B of range pole 22. So while some aspects of the invention include capturing and storing position data when within tolerance, this alternate variation includes capturing and storing position data after adjusting it using the tilt and direction data.

(6) The tilt information may be stored along with the position data, for post-processing and quality control/assurance.

Staking Out (1) Smart-Staking: When staking a point, it is necessary for the surveyor to have directions to a target point at all times so that the point may be located. Traditionally, the directions to the stakeout point come from the RTS, using optical tracking and continuous distance measurement. This process exposes the surveyor to the same weaknesses already identified in optical tracking: reduced battery life on the total station, lost tracking when line of sight is lost, and susceptibility to stray reflectors. Embodiments of the present invention enable the use of Smart-Staking to remove the position of the RTS from the staking process. These embodiments instead use the position of the GNSS receiver 20 to give the user stakeout directions as the point is approached. Once the data collector 26 discovers that the surveyor is in close proximity to the desired point, it will automatically rotate the RTS to the location of the prism 8, lock to the prism, and seamlessly switch to the conventional mode of using the RTS to provide its more accurate directions, and being locked to the prism, the RTS will be ready to capture measurement data once the surveyor has located the desired point.

(2) Combining GNSS Receiver Tilt Sensors with Total Station Measurements: As described hereinabove, many GNSS receiver may be equipped with built in tilt and compass sensors. This allows users to measure accurate positions to the tip (the ground engaging end) of the pole 22 even when the GGNSS receiver is not level, by using the tilt sensors to compensate for the tilt. When the GNSS receiver 20 is mounted on the same pole 22 at a fixed distance from the prism 18, these embodiments apply the tilt sensor measurements to the total station measurements as described hereinabove. This means that all of the above features work even when the pole is not level. The total station will measure a position to the prism. If the software detects that the GPS receiver is not level, it will either warn the user to level his pole, or automatically calculate the position at the tip of the pole using the fixed offset between the GPS receiver and the prism, combined with the compass and tilt sensor readings from the GPS receiver, e.g., using Calculations (1) and (2) described hereinabove.

(3) Also, in particular embodiments, when staking out a point list, without touching the keyboard, the user walks to the next point in order, or next closest point, and when the rover detects that it is at that point, it auto-stores once level (i.e., within the level tolerance 102). The user may thus stakeout without touching the keyboard, based on meeting position and level tolerance, i.e., tolerance-based stakeout without button presses.

(4) The above option applies to staking out a single point—move to it, get level, point is measured. No button press. So the key here is staking without touching the data collector—with preset option to store the staked point (also to go into the raw file, confirming tolerance data) or just providing screen notification for hammering the stake into the ground at that point.

FIG. 12 shows a diagrammatic representation of a machine in the exemplary form of a computer system 300 within which a set of instructions, for causing the machine to perform any one of the methodologies discussed above, may be executed. In alternative embodiments, the machine may include a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.,) unit 316, a signal generation device 320 (e.g., a speaker) and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention, and as further described hereinbelow.

Furthermore, embodiments of the present invention include a computer program code-based product, which includes a computer readable storage medium having program code stored therein which can be used to instruct a computer to perform any of the functions, methods and/or modules associated with the present invention. The non-transitory computer readable medium includes any of, but not limited to, the following: CD-ROM, DVD, magnetic tape, optical disc, hard drive, floppy disk, ferroelectric memory, flash memory, phase-change memory, ferromagnetic memory, optical storage, charge coupled devices, magnetic or optical cards, smart cards, EEPROM, EPROM, RAM, ROM, DRAM, SRAM, SDRAM, and/or any other appropriate static, dynamic, or volatile memory or data storage devices, but does not include a transitory signal per se.

The above systems are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic or non-volatile, and may be retrieved by the user in any of: conventional computer storage, display (e.g., CRT, flat panel LCD, plasma, etc.) and/or hardcopy (i.e., printed) formats. The programming of the present invention may be implemented by one skilled in the art of computer systems and/or software design.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

It should be further understood that any of the features described with respect to one of the embodiments described herein may be similarly applied to any of the other embodiments described herein without departing from the scope of the present invention.

Having thus described the invention, what is claimed is:

1. A Robotic Total Station (RTS) system comprising:

an RTS disposed for at least two-axis rotation on a tripod;

a rover including a prism supported by a range pole, and GNSS receiver disposed on the range pole at a fixed distance from the prism, the GNSS receiver configured to generate three-dimensional location data (GNSS-derived position measurements) for the GNSS receiver;

the RTS configured to rotate on the tripod to point towards the rover and generate an RTS-position measurement of the rover by transmitting and capturing a reflection of an optical signal from the prism;

a plurality of inclination sensors disposed on the range pole in operative engagement with the GNSS receiver, the inclination sensors configured to generate inclination data for the range pole along mutually orthogonal x and y axes;

a hand-held data collector computer including a display;

a data collection module implemented by the data collector computer, and configured to generate a data collection graphical user interface (GUI) visible on the display;

the data collector computer being communicably coupled to the GNSS receiver and configured to receive from the GNSS receiver, the three-dimensional location data and the inclination data for the range pole in real-time;

the RTS being communicably coupled to the data collector and/or the GNSS receiver, the RTS configured to receive and use the GNSS-derived position measurements and the inclination data for the range pole in real-time, to automatically track and point the RTS towards the prism;

a virtual level component implemented by the data collector computer, configured to use the inclination data to display on the GUI real-time tilt information for the range pole in the form of a virtual bubble level indicator;

the virtual level component including a stored program executable by the data collector computer, configured to:

use the inclination data along with the height of the range pole to calculate and display with the GUI, a horizontal distance and direction to move the top of the range pole to level the GNSS receiver, wherein the horizontal distance is calculated using the formula:

$$\text{incline}=a\cos(\cos(x\_\text{tilt})*\cos(y\_\text{tilt}))\text{where,}$$

xtilt=the inclination data for the range pole along the x axis, ytilt=the inclination data for the range pole along the y axis, and $$\text{horizontaldistancefromlevel}=rh*\sin(\text{incline})$$

where, rh=the height of the range pole.

2. The RTS system of claim 1, wherein the data collector computer further comprises a stored program configured to calculate the position of the range pole on the ground (ts_x_adjusted, ts_y_adjusted, ts_z_adjusted) as measured from the total station, taking into account the inclination data, using the following algorithm (i):

$$\text{incline}=a\cos(\cos(gps\_x\text{tilt})*\cos(gps\_y\text{tilt}));$$

$$\text{dist}=ts\_rh*\sin(\text{incline});$$

$$y\_\text{offset}=\text{dist}*\cos(gps\_\text{orientation});$$

$$x\_\text{offset}=\text{dist}*\sin(gps\_\text{orientation});$$

$$\text{new}\_z=ts\_rh*\cos(gps\_x\text{tilt})*\cos(gps\_y\text{tilt});$$

$$z\_\text{offset}=ts\_rh-\text{new}\_elv;$$

$$ts\_x\_\text{adjusted}=ts\_x+x\_\text{offset};$$

$$ts\_y\_\text{adjusted}=ts\_y+y\_\text{offset};$$

$$ts\_z\_\text{adjusted}=ts\_z+z\_\text{offset};$$

where, range pole position on the ground as measured from the total station, assuming level pole:

ts_x, ts_y, ts_z rod height of total station: ts_rh (measured from RTS 8 to the ground)

tilt of receiver 20: gps_xtilt, gps_ytilt.

3. The RTS system of claim 2, wherein the data collector computer further comprises a stored program configured to calculate the position of the prism (prism_x, prism_y, prism_z), using the following algorithm (ii):

$$prism\_to\_apc=gps\_to\_prism\_offset+L1\_Offset;$$

$$incline=a\cos(\cos(gps\_xtilt)*\cos(gps\_ytilt));$$

$$dist=prism\_to\_apc*\sin(incline);$$

$$y\_offset=dist*\cos(gps\_orientation);$$

$$x\_offset=dist*\sin(gps\_orientation);$$

$$new\_z=prism\_to\_apc*\cos(gps\_xtilt)*\cos(gps\_ytilt);$$

$$z\_offset=prism\_to\_apc-new\_elv;$$

$$prism\_x=apc\_x+x\_offset;$$

$$prism\_y=apc\_y+y\_offset;$$

$$prism\_z=apc\_z+z\_offset-prism\_to\_apc;$$

where, location of GPS antenna phase center: apc_x, apc_y, apc_z fixed offset between the prism and the measurement point on the GNSS receiver:

gps_to_prism_offset fixed offset between the phase center of the GPS antenna and the measurement point of the GPS receiver: L1_Offset tilt of GPS receiver: gps_xtilt, gps_ytilt.

4. The RTS system of claim 3, wherein the data collector computer further comprises a stored program configured to, as the rover traverses a site:

(a) capture outputs from the GNSS receiver in real time;

(b) calculate a GNSS-derived position of the range pole using algorithm (i) in real time;

(c) calculate a GNSS-derived position of the prism using algorithm (ii) in real time; and (d) transmit the GNSS-derived position of the prism to the RTS, causing the RTS to point towards the prism, wherein the RTS is pointed towards the prism and ready to generate an RTS-derived position of the prism by transmitting and capturing a reflection of an optical signal from the prism, as the rover traverses the site.

5. The RTS system of claim 4, wherein the data collector computer further comprises a stored program configured to:

(e) monitor velocity of the rover during said (a)-(c); and (f) wait for the velocity to drop below a predetermined level before executing said transmit (d).

6. The RTS system of claim 4, wherein the data collector computer further comprises a stored program configured to:

generate directions to a stakeout location using said GNSS-derived position measurements during said (a)-(c) when the rover is at or above a predetermined distance from the stakeout location; and once the GNSS-derived position measurements indicate that the rover is below the predetermined distance from the stakeout location, cause the RTS to point towards the prism and initiate optical tracking to generate the RTS-derived position of the prism and to generate directions to the stakeout location using the RTS-derived position of the prism.

7. The RTS system of claim 4, wherein the data collector computer further comprises a stored program configured to use said inclination data for the range pole to adjust the RTS-derived position of the prism to compensate for inclination of the range pole.

8. The system of claim 1, wherein the GUI is configured to display a bubble relative to a circle corresponding to a target position, with the bubble configured to move in real-time as the range pole supporting the GNSS receiver is tilted.

9. The system of claim 8, wherein the GUI is configured to selectively display the bubble inside the circle when the pole is oriented within a predetermined tolerance of the horizontal distance from level, and to display at least a portion of the bubble outside the circle when the pole is oriented outside the predetermined tolerance.

10. The system of claim 9, wherein the bubble selectively changes color when inside and outside the circle.

11. The system of claim 9, wherein the data collection module is configured to permit or refuse capture of the location data when the pole is respectively within or outside the predetermine tolerance.

12. The system of claim 11, wherein the data collection module is configured to automatically capture, without additional user interaction, the location data at predetermined intervals of distance and/or time once the pole is within the predetermined tolerance.

13. The system of claim 1, further comprising an audio component configured to generate an audible signal configured to guide a user to the predetermined tolerance without requiring the user to view the display.

14. The system of claim 13, wherein the audio component is configured to generate an audible signal that varies in pitch or frequency in accordance with the real-time tilt information.

15. The system of claim 1, wherein the data collection module is configured to use the inclination data and the height of the range pole to adjust the location data to compensate for any inclination of the range pole, to generate corrected location information for the GNSS Receiver.

16. The system of claim 15, further comprising at least one directional sensor disposed on the range pole in operative engagement with the GNSS receiver, the directional sensor configured to generate direction data corresponding to the orientation of the GNSS receiver in a horizontal plane, the data collector computer being configured to receive from the GNSS receiver, the direction data for the GNSS receiver in real-time.

17. The system of claim 16, wherein the directional sensor comprises an electronic compass.

18. The system of claim 16, wherein the data collection module is configured to use the inclination data and the direction data to adjust the location data to compensate for any inclination of the range pole, to generate the corrected location information for the GNSS Receiver.

19. The system of claim 18, wherein the data collection module is configured to generate corrected location information for the GNSS receiver when the pole is tilted outside a predetermined tolerance.

20. The system of claim 1, wherein the data collection module is configured to capture and store the inclination data and location data for post-processing.

21. A Robotic Total Station (RTS) method for data collection, comprising:

(a) disposing an RTS for at least two-axis rotation on a tripod;

(b) configuring a rover to include a prism supported by a range pole, and GNSS receiver disposed on the range pole at a fixed distance from the prism, the GNSS receiver configured to generate three-dimensional location data (GNSS-derived position measurements) for the GNSS receiver;

(c) configuring the RTS to rotate on the tripod to point towards the rover and generate an RTS-position measurement of the rover by transmitting and capturing a reflection of an optical signal from the prism;

(d) configuring a plurality of inclination sensors to generate inclination data for the range pole along mutually orthogonal x and y axes;

(e) providing a hand-held data collector computer including a display, a data collection module, and configured to generate a data collection graphical user interface (GUI) visible on the display;

(f) communicably coupling the data collector computer to the GNSS receiver to receive from the GNSS receiver, the three-dimensional location data and the inclination data for the range pole in real-time;

(g) communicably coupling the RTS to the data collector and/or the GNSS receiver, to receive and use the GNSS-derived position measurements and the inclination data for the range pole in real-time, to automatically track and point the RTS towards the prism;

(h) configuring, with the data collector computer, a virtual level component to use the inclination data to display on the GUI real-time tilt information for the range pole in the form of a virtual bubble level indicator;

(i) executing a stored program with the data collector computer, to:

use the inclination data along with the height of the range pole to calculate and display with the GUI, a horizontal distance and direction to move the top of the range pole to level the GNSS receiver, wherein the horizontal distance is calculated using the formula:

$$incline = a\cos(\cos(x\_tilt)*\cos(y\_tilt))$$ where, xtilt=the inclination data for the range pole along the x axis, ytilt=the inclination data for the range pole along the y axis, and $$horizontaldistancefromlevel = rh*\sin(incline)$$

where, rh=the height of the range pole.

22. The RTS method of claim 21, further comprising calculating the position of the range pole on the ground (ts_x_adjusted, ts_y_adjusted, ts_z_adjusted) as measured from the total station, taking into account the inclination data, using the following algorithm (i):

$$incline = a\cos(\cos(gps\_xtilt)*\cos(gps\_ytilt));$$

$$dist = ts\_rh*\sin(incline);$$

$$y\_offset = dist*\cos(gps\_orientation);$$

$$x\_offset = dist*\sin(gps\_orientation);$$

$$new\_z = ts\_rh*\cos(gps\_xtilt)*\cos(gps\_ytilt);$$

$$z\_offset = ts\_rh - new\_elv;$$

$$ts\_x\_adjusted = ts\_x + x\_offset;$$

$$ts\_y\_adjusted = ts\_y + y\_offset;$$

$$ts\_z\_adjusted = ts\_z + z\_offset;$$

where, range pole position on the ground as measured from the total station, assuming level pole:

ts_x, ts_y, ts_z rod height of total station: ts_rh (measured from RTS 8 to the ground)

tilt of receiver 20: gps_xtilt, gps_ytilt.

23. The RTS method of claim 22, further comprising calculating the position of the prism (prism_x, prism_y, prism_z), using the following algorithm (ii):

$$prism\_to\_apc = gps\_to\_prism\_offset + L1\_Offset;$$

$$incline = a\cos(\cos(gps\_xtilt)*\cos(gps\_ytilt));$$

$$dist = prism\_to\_apc*\sin(incline);$$

$$y\_offset = dist*\cos(gps\_orientation);$$

$$x\_offset = dist*\sin(gps\_orientation);$$

$$new\_z = prism\_to\_apc*\cos(gps\_xtilt)*\cos(gps\_ytilt);$$

$$z\_offset = prism\_to\_apc - new\_elv;$$

$$prism\_x = apc\_x + x\_offset;$$

$$prism\_y = apc\_y + y\_offset;$$

$$prism\_z = apc\_z + z\_offset - prism\_to\_apc;$$

where, location of GPS antenna phase center: apc_x, apc_y, apc_z fixed offset between the prism and the measurement point on the GNSS receiver:

gps_to_prism_offset fixed offset between the phase center of the GPS antenna and the measurement point of the GPS receiver: L1_Offset tilt of GPS receiver: gps_xtilt, gps_ytilt.

24. The RTS method of claim 23, further comprising, as the rover traverses a site:

(a) capturing outputs from the GNSS receiver in real time;

(b) calculating a GNSS-derived position of the range pole using algorithm (i) in real time;

(c) calculating a GNSS-derived position of the prism using algorithm (ii) in real time; and (d) transmitting the GNSS-derived position of the prism to the RTS, causing the RTS to point towards the prism, wherein the RTS is pointed towards the prism and ready to generate an RTS-derived position of the prism by transmitting and capturing a reflection of an optical signal from the prism, as the rover traverses the site.

25. The RTS method of claim 24, further comprising:

(e) monitoring velocity of the rover during said (a)-(c); and (f) waiting for the velocity to drop below a predetermined level before executing said transmitting (d).

26. The RTS method of claim 24, further comprising:

generating directions to a stakeout location using said GNSS-derived position measurements during said (a)-(c) when the rover is at or above a predetermined distance from the stakeout location; and once the GNSS-derived position measurements indicate that the rover is below the predetermined distance from the stakeout location, causing the RTS to point towards the prism and initiate optical tracking to generate the RTS-derived position of the prism and to generate directions to the stakeout location using the RTS-derived position of the prism.

27. The RTS method of claim 24, further comprising using said inclination data for the range pole to adjust the RTS-derived position of the prism to compensate for inclination of the range pole.

* * * * *